United States Patent
Cociglio et al.

(10) Patent No.: US 9,264,336 B2
(45) Date of Patent: Feb. 16, 2016

(54) MEASUREMENT ON A DATA FLOW IN A COMMUNICATION NETWORK

(75) Inventors: Mauro Cociglio, Turin (IT); Luca Castaldelli, Turin (IT)

(73) Assignee: Telecom Italia S.p.A., Milan (IT)

( * ) Notice: Subject to any disclaimer, the term of this patent is extended or adjusted under 35 U.S.C. 154(b) by 469 days.

(21) Appl. No.: 13/883,071

(22) PCT Filed: Nov. 5, 2010

(86) PCT No.: PCT/EP2010/066955
§ 371 (c)(1),
(2), (4) Date: May 2, 2013

(87) PCT Pub. No.: WO2012/059138
PCT Pub. Date: May 10, 2012

(65) Prior Publication Data
US 2013/0223274 A1    Aug. 29, 2013

(51) Int. Cl.
*H04L 12/26*    (2006.01)

(52) U.S. Cl.
CPC ........ *H04L 43/0888* (2013.01); *H04L 12/2602* (2013.01); *H04L 43/00* (2013.01); *H04L 43/087* (2013.01); *H04L 43/0858* (2013.01); *H04L 43/0876* (2013.01); *H04L 43/106* (2013.01)

(58) Field of Classification Search
CPC ... H04L 43/106; H04L 43/0888; H04L 43/00; H04L 43/0858; H04L 47/10; H04L 12/2602; H04W 28/10
See application file for complete search history.

(56) References Cited

U.S. PATENT DOCUMENTS

| | | | |
|---|---|---|---|
| 6,188,674 B1 | 2/2001 | Chen et al. | |
| 6,480,899 B1 | 11/2002 | Seddigh et al. | |
| 8,451,734 B2 * | 5/2013 | Cociglio | H04L 43/0835 370/235.1 |
| 2003/0007785 A1* | 1/2003 | Shimizu | H04N 7/17318 386/211 |
| 2003/0181214 A1* | 9/2003 | Grob | H04L 1/1809 455/515 |
| 2005/0123003 A1* | 6/2005 | Bordonaro | H04L 41/5009 370/516 |
| 2014/0160975 A1* | 6/2014 | Cociglio | H04L 43/0829 370/252 |

(Continued)

FOREIGN PATENT DOCUMENTS

| | | |
|---|---|---|
| EP | 1496652 A2 | 1/2005 |
| EP | 1855416 A1 | 11/2007 |
| WO | 2010/072251 A1 | 7/2010 |

OTHER PUBLICATIONS

International Search Report mailed Oct. 28, 2011, corresponding PCT/EP2010/066955.

(Continued)

*Primary Examiner* — Mounir Moutaouakil
(74) *Attorney, Agent, or Firm* — Banner & Witcoff, Ltd.

(57) ABSTRACT

Disclosed is a method for performing a measurement (namely, a data loss measurement and/or a time measurement) on a data flow to be transmitted in a communication network. The method includes: upon transmission of the data flow, during first block periods that alternate in time with second block periods, marking each data unit of the data flow by setting a feature thereof to a first value and updating a first parameter; upon reception of the data flow, checking the feature for each received data unit and updating a second parameter when the feature is equal to the first value; while transmission and reception are performed, processing a timer for determining whether a current block period is one of the second block periods and, in the affirmative, providing current values of the first and second parameters; and performing a measurement using the current values of the first and second parameters.

15 Claims, 8 Drawing Sheets

(56) References Cited

U.S. PATENT DOCUMENTS

2014/0369218 A1* 12/2014 Ionta .................... H04L 43/026
370/252

OTHER PUBLICATIONS

Written Opinion of the ISA for corresponding PCT/EP2010/066955.

* cited by examiner

| block period | start time | marking |
|---|---|---|
| T1 | 0 | 1 |
| T2 | Tb | 0 |
| T3 | 2Tb | 1 |
| T4 | 3Tb | 0 |
| ... | ... | ... |
| Tn-1 | (n-2)Tb | 1 |
| Tn | (n-1)Tb | 0 |

MTT

Figure 3

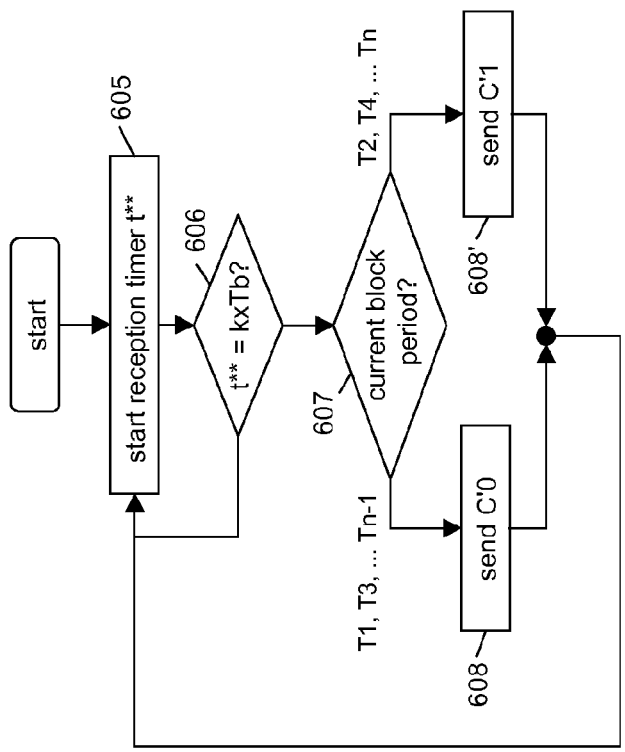
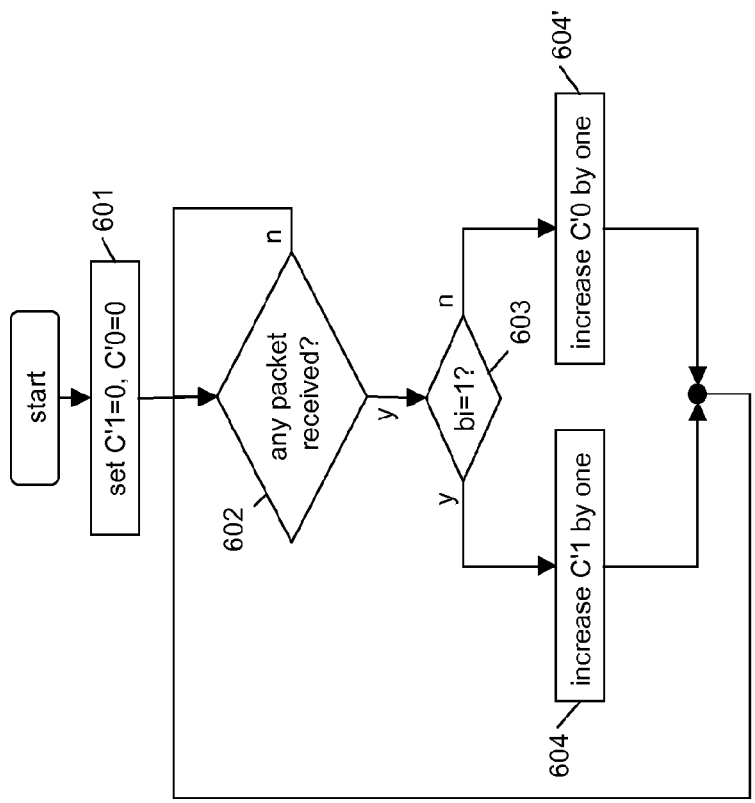
*Figure 6b*
*Figure 6a*

MEASUREMENT ON A DATA FLOW IN A COMMUNICATION NETWORK

CROSS REFERENCE TO RELATED APPLICATIONS

This is a U.S. National Phase application under 35 U.S.C. §371 of International Application No. PCT/EP2010/066955, filed Nov. 5, 2010, which was published Under PCT Article 21(2), the entire contents of which are incorporated herein by reference.

TECHNICAL FIELD

The present invention relates to the field of communication networks. In particular, the present invention relates to a method for performing a measurement, in particular a data loss measurement and/or a time measurement (in particular, a measurement of delay and/or interarrival jitter), on a data flow transmitted in a communication network. Further, the present invention relates to a communication network implementing such a method.

BACKGROUND ART

In a packet-switched communication network, data are transmitted in the form of packets that are routed from a source node to a destination node through possible intermediate nodes. Exemplary packet-switched networks are Local Area Networks (e.g. Ethernet) and Geographic Area Networks (e.g. Internet).

On the other hand, in circuit-switched networks data are transmitted in the form of continuous bit flows carried from the source node to the destination node within plesiochronous or synchronous frames. Exemplary circuit-switched networks are PDH, SDH, Sonet and OTN networks.

Herein after, the expression "data unit" will designate a portion of a data flow transmitted in a communication network. In particular, in case of a packet-switched network, a data unit may be a packet or a portion of a packet. Besides, in case of a circuit-switched network, a data unit may be a plesiochronous frame, a portion of a plesiochronous frame, a synchronous frame or a portion of a synchronous frame.

Data transmitted either in a packet-switched network or in a circuit-switched network from a source node not always reach the destination node, i.e. they may be lost during transmission through the network.

Loss of data may be due to different reasons. For instance, in a packet-switched network, data within a packet may be discarded by an intermediate node, since the port at which the packet is received or through which the packet has to be forwarded is congested. Besides, both in packet-switched networks and in circuit-switched networks, data may be discarded by an intermediate node or by the destination node, since they contain bit errors.

When providing a service by transmitting data through a packet-switched network or a circuit-switched network, the rate of data lost during transmission affects the quality of service (QoS) of that service.

Besides, a data unit is transmitted at a transmission time by the source node and is received at a reception time by the destination node. The time elapsing between transmission time and reception time is typically called "one way delay" (or, briefly, "delay"). The delay of a data unit is given by the following equation:

$$D(i)=Ri-Si, \qquad [1]$$

where Si is the transmission time and Ri is the reception time of the data unit.

The delay of a data unit mainly depends on the number of possible intermediate nodes crossed by the data unit from source to destination and on the permanence time of the data unit at the source node and at each possible intermediate node. In packet-switched networks, where data units are routed hop-by-hop by each node, both the number of possible intermediate nodes crossed by data units and the permanence time of data units at each node are unpredictable. Accordingly, the delay of a data unit is almost unpredictable. Besides, data units of a same data flow may have different delays.

In a packet-switched communication network, the difference in the delays of two data units (i.e. packets) of a same data flow is termed "interarrival jitter". In particular, if Si and Sj are the transmission times for a first packet i and a second packet j, and Ri and Rj are the reception times for the first packet i and the second packet j, the interarrival jitter may be expressed as:

$$J(i,j)=(Rj-Ri)-(Sj-Si). \qquad [2]$$

When a communication service (in particular, a real-time voice or data service such as calls, conference calls, video conferences, etc.) is provided by means of a communication network, the delay and interarrival jitter of the data flows carrying the service strongly affect the quality of service (QoS) perceived by the end users of the service.

Therefore, measuring the data loss and delay/interarrival jitter of the data flows carrying services is of particular interest for network operators.

WO 2010/072251 (in the name of the same Applicant) discloses a method for measuring data loss of a data flow transmitted through a communication network from a transmitting node to a receiving node. Before transmitting the data units of the data flow, the transmitting node marks each data unit for dividing the data flow in blocks. In particular, the transmitting node marks each data unit by setting a bit of its header to "1" or "0". The marking results in a sequence of blocks, where blocks of data units marked with "1" temporally alternate with blocks of data units marked with "0". The blocks may have a same duration termed "block period" Tb. Further, while marking the data units, the transmitting node increases by one a first counter C1 each time a data unit is marked by "1", and a second counter C0 each time a data unit is marked by "0". The marked data units are then received at the receiving node. Each time the receiver node receives a data unit, it checks its marking, increases a third counter C'1 if the marking is "1" and increases a fourth counter C'0 if the marking is "0".

According to WO 2010/072251, while the transmitting and receiving nodes are operating as described above, a management server cooperating with the transmitting and receiving nodes periodically detects the values of the counters C1, C0, C'1 and C'0, and uses them for calculating the data loss. The detection period Td has a maximum value that depends on the block period Tb according to the following formula: Tb>2*Td. In other words, the values of the counters C1, C0, C'1 and C'0 should be detected at least twice in each block period. Assuming that Tb is equal to 5 minutes, Td may be equal to 2 minutes.

At each detection time Td, the management server compares the detected current values of C1, C0, C'1 and C'0 with the corresponding previously detected values for determining which one of the counters C1, C0 and which one of the counters C'1, C'0 have a fixed value during the current block period. Indeed, from the above described marking procedure it follows that, in each block period, one of the counters C1, C0 has a fixed value while the other one is increasing, and one of the counters C'1, C'0 has a fixed value while the other one is increasing. Assuming that the management server determines that, during the current block period, the counters C0 and C'0 have a fixed value, the management server calculates the data loss as a difference between the currently fixed values of the counters C0 and C'0.

SUMMARY OF THE INVENTION

The Applicant has perceived the need to improve the solution described by WO 2010/072251.

Indeed, the computational effort and the bandwidth usage required at the management server for supporting the above solution, in some cases, may be too high.

Further, in case the transmitting node does not transmit any data unit to the receiving node for a block period (this may happen when the traffic between transmitting node and receiving node is very low), all the counters C1, C0, C'1 and C'0 have a fixed value. Accordingly, the management server may encounter some difficulties in determining which couple of counters (i.e. the couple C1-C'1 or the couple C0-C'0) should be used for properly calculating the data loss relating to the preceding block period.

In view of the above, the Applicant has tackled the problem of providing a method for performing a measurement on a data flow transmitted from a first communication device to a second communication device of a communication network, which is more efficient from the computational point of view and from the network bandwidth usage point of view, and which allows performing the measurement even after no data units are transmitted during a block period.

In the following description and in the claims, the expression "performing a measurement on a data flow" will designate an operation of measuring data loss on a data flow and/or an operation of performing a time measurement on a data flow.

Further, in the following description and in the claims, the expression "measuring data loss" will designate an operation of measuring a difference between a number of data units (i.e. packets, portions of packets, plesiochronous frames, portions of plesiochronous frames, synchronous frames, portions of synchronous frames) transmitted by a first communication device and a number of data units (i.e. packets, portions of packets, plesiochronous frames, portions of plesiochronous frames, synchronous frames, portions of synchronous frames) received at a second communication device, this difference corresponding to the number of data units lost in transmission from the first communication device to the second communication device.

Further, in the following description and in the claims, the expression "performing a time measurement on a data flow" will designate an operation of measuring:
  a delay induced on a data unit of the data flow by transmission between the first communication device and the second communication device; and/or
  an interarrival jitter induced on a pair of data units of the data flow by transmission between the first communication device and the second communication device.

Further, in the present description and in the claims, the expression "communication device" will designate a port or interface of a node of a communication network.

The first communication device and the second communication device may be comprised in different nodes of the communication network. For instance, the first communication device may be an output port of a first node that transmits the data flow, whereas the second communication device may an input port of a second node that receives the data flow. The first node and the second node may be the source node and the destination node of the data flow or, alternatively, they may be intermediate nodes placed between the source node and the destination node. The first node and the second node may be either physically adjacent (i.e. they are connected by a physical link such as e.g. an optical fiber), or they may be connected through other nodes.

Alternatively, the first communication device and the second communication device may be comprised in a same node. For instance, the first communication device may be an input port of a node that receives the data flow from an upstream node, whereas the second communication device may be an output port of the same node that forwards the data flow to a downstream node. The data loss between the first communication device and the second communication device in this case indicates the number of data units lost within the node (e.g. discarded due to congestion). Further, the delay between the first communication device and the second communication device indicates permanence time of the data units lost within the node.

Besides, in the following description and in the claims, the expression "marking a data unit" will designate an operation of setting a feature of the data unit to a value suitable for distinguishing the data unit from other data units of the same data flow. For instance, the operation of marking a data unit may comprise the operation of setting one or more bits of the data unit (e.g. one bit or a bit sequence of its header) to a predefined value, the operation of setting its frequency or its phase to a predefined value, and so on.

According to a first aspect, the present invention provides a method for performing a measurement on a data flow to be transmitted from a first communication device to a second communication device of a communication network, the method comprising:
a) upon transmission of the data flow:
    during first block periods that alternate in time with second block periods, marking each data unit of the data flow by setting a feature of the data unit to a first value, and updating a first parameter relating to the data units;
b) upon reception of the data flow:
    checking the feature for each received data unit and updating a second parameter relating to the data units when the feature is equal to the first value;
c) while steps a) and b) are performed, processing a timer for determining whether a current block period is one of the second block periods and, in the affirmative, providing a current value of the first parameter and a current value of the second parameter; and
d) performing a measurement on the data flow using the current value of the first parameter and the current value of the second parameter.

According to first advantageous embodiments:
  at step a), the updating comprises increasing a first transmission counter upon transmission of each data unit having the feature set to the first value;
  at step b), the updating comprises increasing a first reception counter upon reception of each data unit having the feature set to the first value;
  at step c), the providing comprises providing a current value of the first transmission counter and a current value of the first reception counter; and
  at step d), the performing a measurement comprises calculating a data loss as a difference between the current value of the first transmission counter and the current value of the first reception counter.

In addition or alternatively:

at step a), the updating comprises updating a first transmission timestamp upon transmission of a predetermined data unit having the feature set to the first value;

at step b), the updating comprises setting a first reception timestamp upon reception of the predetermined data unit;

at step c), the providing comprises providing a current value of the first transmission timestamp and a current value of the first reception timestamp; and at step d), the performing a measurement comprises performing a time measurement using the current value of the first transmission timestamp and the current value of the first reception timestamp.

Preferably, performing a time measurement comprises measuring at least one of a delay and an interarrival jitter of the packet flow.

Preferably, all the first block periods and the second block periods have a same duration Tb.

Preferably, in step c) the timer counts a marking period Tm equal to an even integer multiple of the duration Tb.

According to first advantageous variants, step c) comprises comparing a current time indicated by the timer with a marking timing table comprising information on start time and/or end time of at least one of the first block periods and the second block periods.

Alternatively, if the duration Tb is equal to an odd number of time measurement units, step c) comprises determining whether a current time indicated by the timer and expressed in the time measurement units is a multiple of the duration Tb and is an even number.

Alternatively, if the duration Tb is equal to an even number of time measurement units, step c) comprises determining whether a current time indicated by the timer and expressed in the time measurement units is not an integer multiple of the duration Tb multiplied by 2.

Preferably:

step a) further comprises, during the second block periods, marking each data unit of the data flow by setting the feature of the data unit to a second value, and updating a third parameter relating to the data units;

step b) further comprises updating a fourth parameter relating to the data units when the feature is equal to the second value;

step c) comprises, in the negative, providing a current value of the third parameter and a current value of the fourth parameter; and step d) comprises performing the measurement using the current value of the third parameter and the current value of the fourth parameter.

According to particularly preferred embodiments, step c) is performed by the first communication device and also by the second communication device, while step d) is performed by a management server cooperating with the communication network.

In this case, step c) preferably comprises:

at the first communication device, processing a transmission timer for determining whether a current block period is one of the second block periods and, in the affirmative, sending the current value of the first parameter to the management server; and at the second communication device, processing a reception timer synchronized to the transmission counter for determining whether a current block period is one of the second block periods and, in the affirmative, sending the current value of the second parameter to the management server.

According to a second aspect thereof, the present invention provides a communication network comprising a first communication device and a second communication device, wherein:

the first communication device is configured to transmit a data flow to the second communication device and, upon transmission of the data flow, during first block periods that alternate in time with second block periods, mark each data unit of the data flow by setting a feature of the data unit to a first value, and update a first parameter relating to the data units;

the second communication device is configured to receive the data flow from the first communication device and, upon reception of the data flow, check the feature for each received data unit and update a second parameter relating to the data units when the feature is equal to the first value, wherein the first communication device and the second communication device are further configured to process a timer for determining whether a current block period is one of the second block periods and, in the affirmative, to provide a current value of the first parameter and a current value of the second parameter for performing a measurement on the data flow.

BRIEF DESCRIPTION OF THE DRAWINGS

The present invention will become clearer from the following detailed description, given by way of example and not of limitation, to be read with reference to the accompanying drawings, wherein:

FIG. 3 schematically show a marking timing table according to an embodiment of the present invention;

FIGS. 6a and 6b are flow charts of the operation of the second communication device, according to the first embodiment of the present invention;

DETAILED DESCRIPTION OF PREFERRED EMBODIMENTS OF THE INVENTION

Herein after, a first preferred embodiment of the method will be described in detail by referring to the particular exemplary case of measuring data loss in a packet-switched network by measuring the number of packets (i.e. the data unit is a packet) lost in transmission from a transmitting node to a receiving node.

Figure 1:
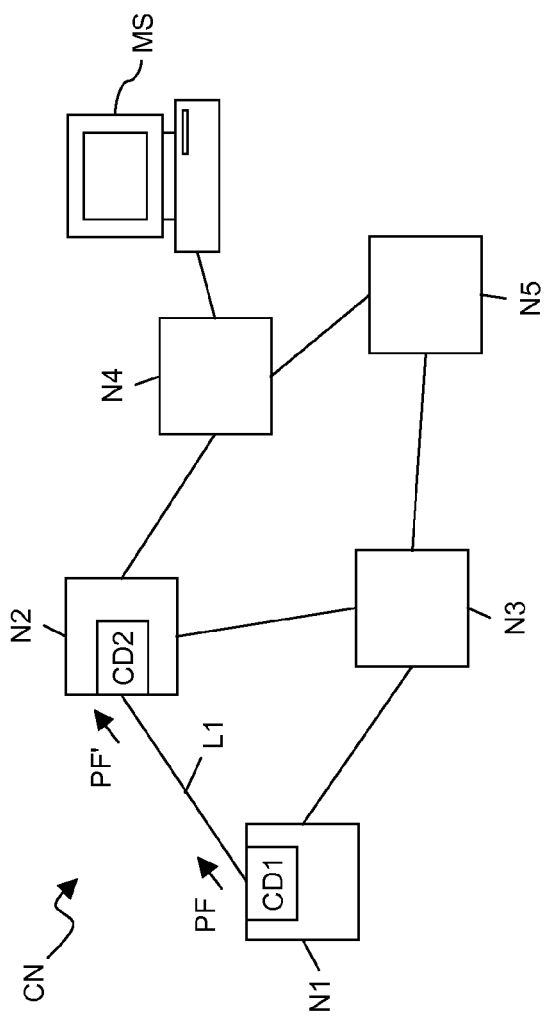
FIG. 1 schematically shows an exemplary packet-switched network.

FIG. 1 schematically shows an exemplary packet-switched communication network CN comprising five nodes N1, N2, . . . N5. The nodes N1, N2, . . . , N5 of the communication network CN comprise communication devices suitable for transmitting and receiving traffic in the form of packet flows. In particular, the node N1 (herein after termed "transmitting node") comprises a first communication device CD1 and the node N2 (herein after termed "receiving node") comprises a second communication device CD2. For instance, the first communication device CD1 may comprise a first Ethernet port, while the second communication device CD2 may comprise a second Ethernet port.

The nodes N1, N2, . . . N5 are connected each other according to a partially meshed topology. In particular, node N1 and N2 are adjacent nodes, their communication devices CD1 and CD2 being connected by the link L1. The number of nodes and the topology of the communication network CN are merely exemplary. The communication network CN may be for instance an Ethernet network, an Internet network, or any other type of packet-switched communication network.

The communication network CN is suitable for cooperating with a management server MS. In FIG. 1, the management server MS is connected to the node N4. This is merely exemplary, since the management server MS may be connected to the communication network CN through any of its nodes N1, N2, . . . , N5. Alternatively, the management server MS may be integrated in any of the nodes N1, N2, . . . , N5 of the communication network CN.

By way of example, herein after only the packet flow PF transmitted from the first communication device CD1 of the transmitting node N1 to the second communication device CD2 of the receiving node N2 through the link L1 will be considered. The transmitting node N1 may be either the source node of the packet flow PF or an intermediate node of the path from the source node to the destination node. Similarly, the receiving node N2 may be either the destination node of the packet flow PF or an intermediate node of the path from the source node to the destination node.

Figure 2:
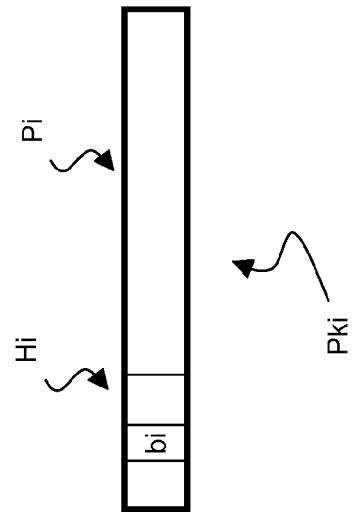
FIG. 2 schematically shows a packet's structure, according to an embodiment of the present invention.

The packet flow PF comprises a plurality of packets Pki. As shown in FIG. 2, each packet Pki has a header Hi and a payload Pi. The payload Pi comprises a portion of the traffic to be transmitted from the source node to the destination node. Besides, preferably, the header Hi comprises information for routing the packet Pki, such as the source node address (i.e. the address of the transmitting node N1, if it is the source node) and the destination node address (i.e. the address of the receiving node N2, if it is the destination node).

According to embodiments of the present invention, upon transmission of the packets Pki of the packet flow PF, the first communication device CD1 preferably marks the packets Pki for dividing the packet flow PF in blocks, each block comprising a number of packets Pki. Preferably, all the blocks have a same time duration, that will be termed herein after "block period" Tb.

The first communication device CD1 preferably uses a bit bi of the header Hi of each packet Pki for marking the packets Pki. In particular, the first communication device CD1 marks the packets Pki by setting the value of the bit bi to 1 or 0. The bit bi may be for instance a bit to which the protocol according to which the packet Pki is formatted has not assigned a specific function yet. Alternatively, the bit bi may be a bit of a field having other uses, such as for instance a bit of the priority field in IP packets, or a bit of the label field in MPLS packets.

The block period Tb may be set by the network operator, according to the desired data loss measurement rate (as it will be described in detail herein after, the block period Tb is also the measurement period). In addition to the block period Tb, the network operator preferably sets a marking period Tm. The marking period Tm and the block period Tb are preferably selected so that the following equation is fulfilled:

$$Tm = n \times Tb, \quad [3]$$

where n is an even integer equal to or higher than 2, and Tm and Tb are expressed in a same unit of measurement (e.g. minutes or seconds). For instance, the marking period Tm may be equal to 60 minutes, and the block period Tb may be equal to e.g. 1, 2, 3, 5, 6, 10, 12, 15 or 30 minutes (i.e. all the values fulfilling the above equation [3] when Tm and Tb are expressed in minutes). The marking period Tm then comprises an even integer number n of block periods T1, T2, T3, T4, . . . Tn−1, Tn.

Figure 4:
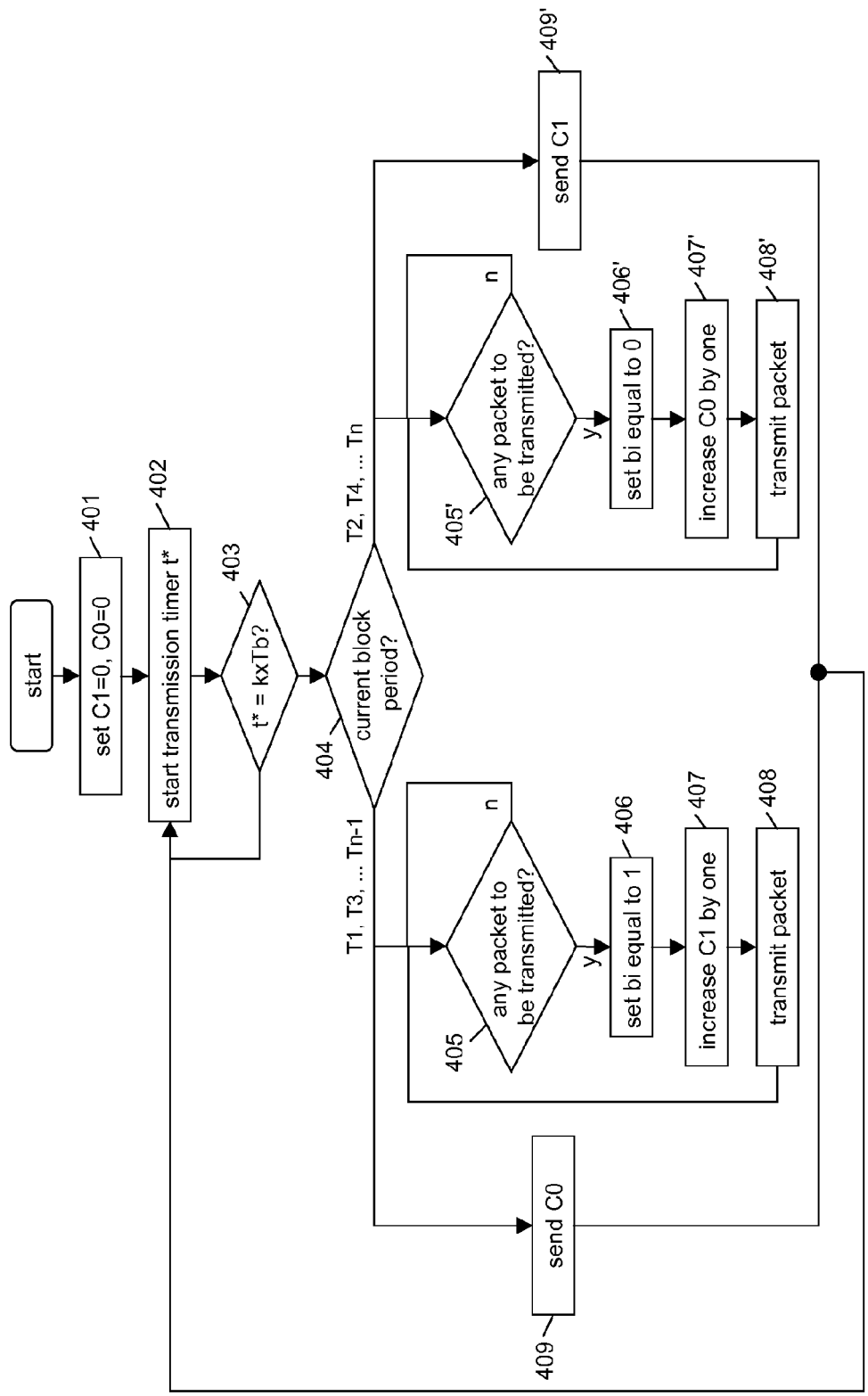
FIG. 4 is a flow chart of the operation of the first communication device, according to a first embodiment of the present invention.

With reference to FIG. 4, when the first communication device CD1 determines that a data loss measurement relative to the packet flow PF has to be started, it preferably initialises a first counter C1 and a second counter C0 at the value 0 (step 401). Then, preferably, the first communication device CD1 starts a transmission timer cyclically counting from 0 to the marking period Tm (step 402). For instance, if Tm is equal to 60 minutes, the transmission timer may cyclically count from 00:00 to 59:59.

When the current time t* indicated by the transmission timer becomes equal to k×Tb (k being equal to 0, 1, 2, . . . n−1) (step 403), the first communication device CD1 preferably determines the current block period among the block periods T1, T2, T3, T4, . . . Tn−1, Tn (step 404). Such determination is preferably performed using a marking timing table MTT.

The structure of the marking timing table MTT is shown in FIG. 3. The marking timing table MTT preferably comprises n rows (i.e. one row per each block period T1, T2, T3, T4, . . . Tn−1, Tn). Each row comprises a start time 0, Tb, 2Tb, 3Tb . . . (n−2)Tb, (n−1)Tb indicating the time at which the block period T1, T2, T3, T4, . . . Tn−1, Tn starts and a marking information, indicating the value (namely, 1 or 0) at which the bit bi should be set in packets Pki marked during the block period T1, T2, T3, T4, . . . Tn−1, Tn. A local copy of the marking timing table MTT may be stored at the transmitting node N1.

For instance, assuming that the marking period Tm is equal to 60 minutes and the block period Tb is equal to 10 minutes (the marking period Tm thereby comprising six block periods T1, T2, T3, T4, T5, T6), the resulting marking timing table MTT is reported herein after.

TABLE I

| block period | start time | marking |
| --- | --- | --- |
| T1 | 00:00 | 1 |
| T2 | 10:00 | 0 |
| T3 | 20:00 | 1 |
| T4 | 30:00 | 0 |
| T5 | 40:00 | 1 |
| T6 | 50:00 | 0 |

The start times are expressed in the format "minutes:seconds".

At step 404, the first communication device CD1 preferably determines the current block period by comparing the current time t* indicated by the transmission timer with the content of the marking timing table MTT. In particular, the current block period is determined as the block period whose start time is equal to the read current time t* as indicated by the transmission timer at step 403.

During step 404, the first communication device CD1 preferably also reads in the marking timing table MTT the marking associated to the determined current block period, thereby determining the marking that has to be applied to packets that will be transmitted during the current block period.

For instance, by referring to the above exemplary Table I, when at step 403 the current time t* indicated by the transmission timer is e.g. 30:00, at step 404 the first communication device CD1 determines that the current block period is T4 and that the corresponding marking is 0.

Then, the first communication device CD1 waits for possible packets Pki to be transmitted and marks them by either 1 or 0 as determined at step 404.

In particular, if the current block period is an odd period T1, T3, ... Tn−1, when a packet Pki has to be transmitted (step 405), the first communication device CD1 preferably marks it by setting its bit bi to 1 (step 406), increases by one the value of the first counter C1 (step 407) and transmits the packet Pki along the link L1 (step 408). Otherwise, if the current block period is an even period T2, T4, ... Tn, when a packet Pki has to be transmitted (step 405'), the first communication device CD1 preferably marks it by setting its bit bi to 0 (step 406'), increases by one the value of the second counter C0 (step 407') and transmits the packet Pki along the link L1 (step 408').

Figure 5:
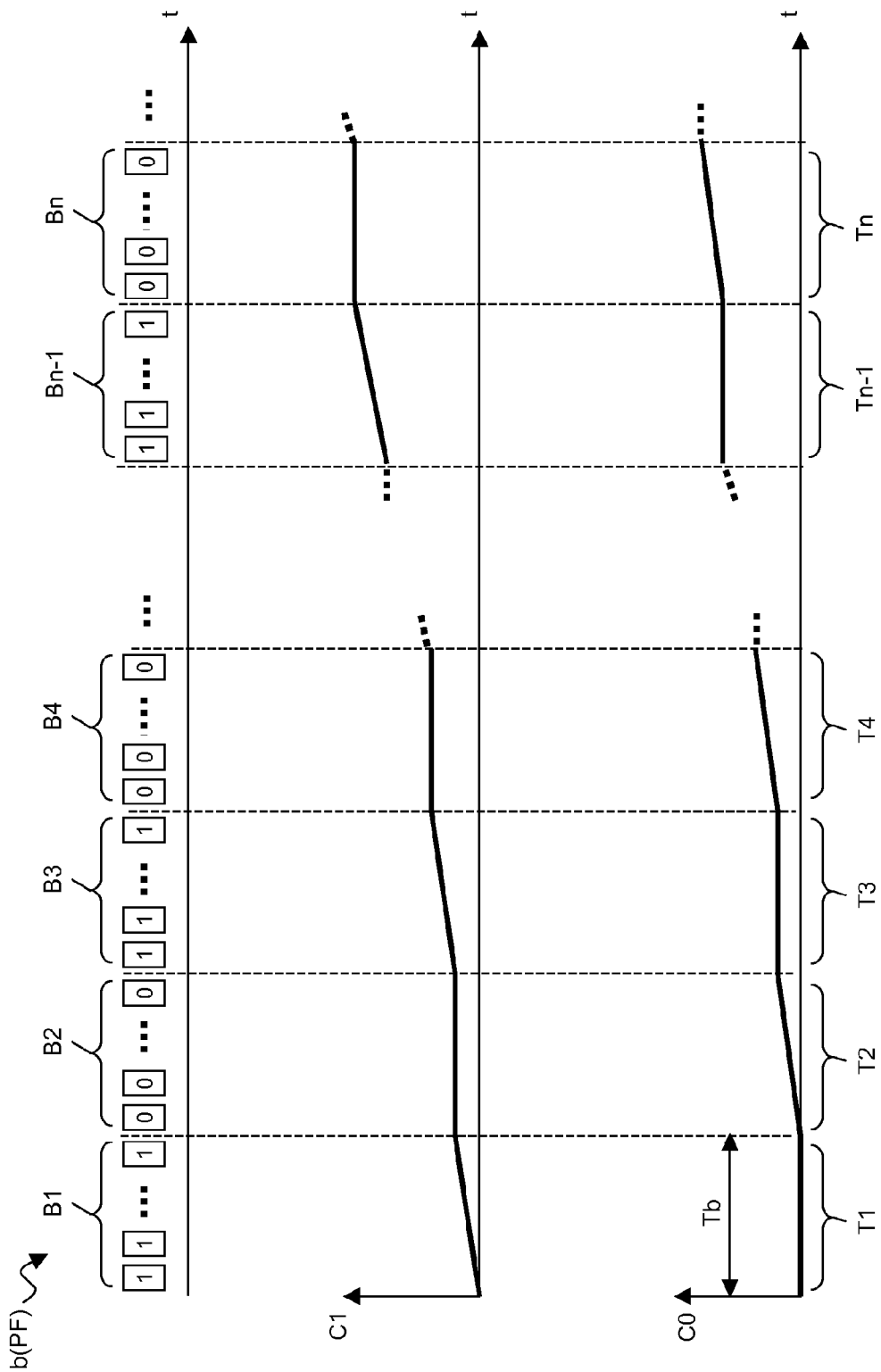
FIG. 5 shows three time diagrams relating to the operation of the first communication device.

Therefore, during the odd block periods T1, T3, ... Tn−1, the packets Pki transmitted by the first communication device CD1 form odd blocks B1, B3, ... Bn−1 (shown in FIG. 5) and are marked by their bit bi set to 1 (in FIG. 5, the reference "b(PF)" indicates the values of the bit bi for the packets Pki of the packet flow PF). Besides, as also shown in FIG. 5, during the odd block periods T1, T3, ... Tn−1 the value of the first counter C1 increases, while the value of the second counter C0 is constant.

On the other hand, during the even block periods T2, T4, ... Tn, the packets Pki transmitted by the first communication device CD1 form even blocks B2, B4, ... Bn (shown in FIG. 5) and are marked by their bit bi set to 0. Besides, as also shown in FIG. 5, during the even block periods T2, T4, ... Tn the value of the second counter C0 increases, while the value of the first counter C1 is constant.

FIG. 5 shows the blocks transmitted during a single marking period Tm. The operation of the first communication device CD1 is however periodical with period Tm. As a result, the packet flow PF is divided in a sequence of blocks of duration Tb, wherein blocks including packets Pki marked by the bit bi equal to 1 alternate in time with blocks including packets Pki marked by the bit bi equal to 0. Since, according to the above equation [3], the marking period Tm is an even multiple of the block period Tb, the alternation of blocks comprising 1-marked packets and blocks comprising 0-marked packets is the same in all the marking periods Tm. In other words, in all the marking periods Tm, the odd blocks B1, B3, ... Bn−1 include packets Pki marked by the bit bi equal to 1, while the even blocks B2, B4, Bn include packets Pki marked by the bit bi equal to 0.

Blocks formed according to the above described flow chart of FIG. 4 may include different numbers of packets Pki. Indeed, the number of packets Pki forming a given block depends on the number of packets actually transmitted by the first communication device CD1 during each block period. For instance, during low-traffic hours, the blocks comprise a lower number of packets than during high-traffic hours. For the same reason, the first packet Pki of each block is not necessarily transmitted at the beginning of the corresponding block period.

Referring again to FIG. 4, if the current block period determined at step 404 is an odd period T1, T3, ... Tn−1, the first communication device CD1 determines that the value of the counter C1 may be currently increasing, whereas the value of the counter C0 is currently constant. Hence, the first communication device CD1 preferably sends the currently constant value of the second counter C0 to the management server MS (step 409).

Otherwise, if the current block period determined at step 404 is an even period T2, T4, ... Tn, the first communication device CD1 determines that the value of the counter C0 may be currently increasing, whereas the value of the counter C1 is currently constant. Hence, the first communication device CD1 preferably sends the currently constant value of the first counter C1 to the management server MS (step 409').

Preferably, at steps 409-409', the time at which the value of the relevant counter C1 or C0 is sent to the management server MS is delayed by a safety wait time SWT relative to the start time of the current block period, for reasons that will be described in detail herein after.

Figure 7:
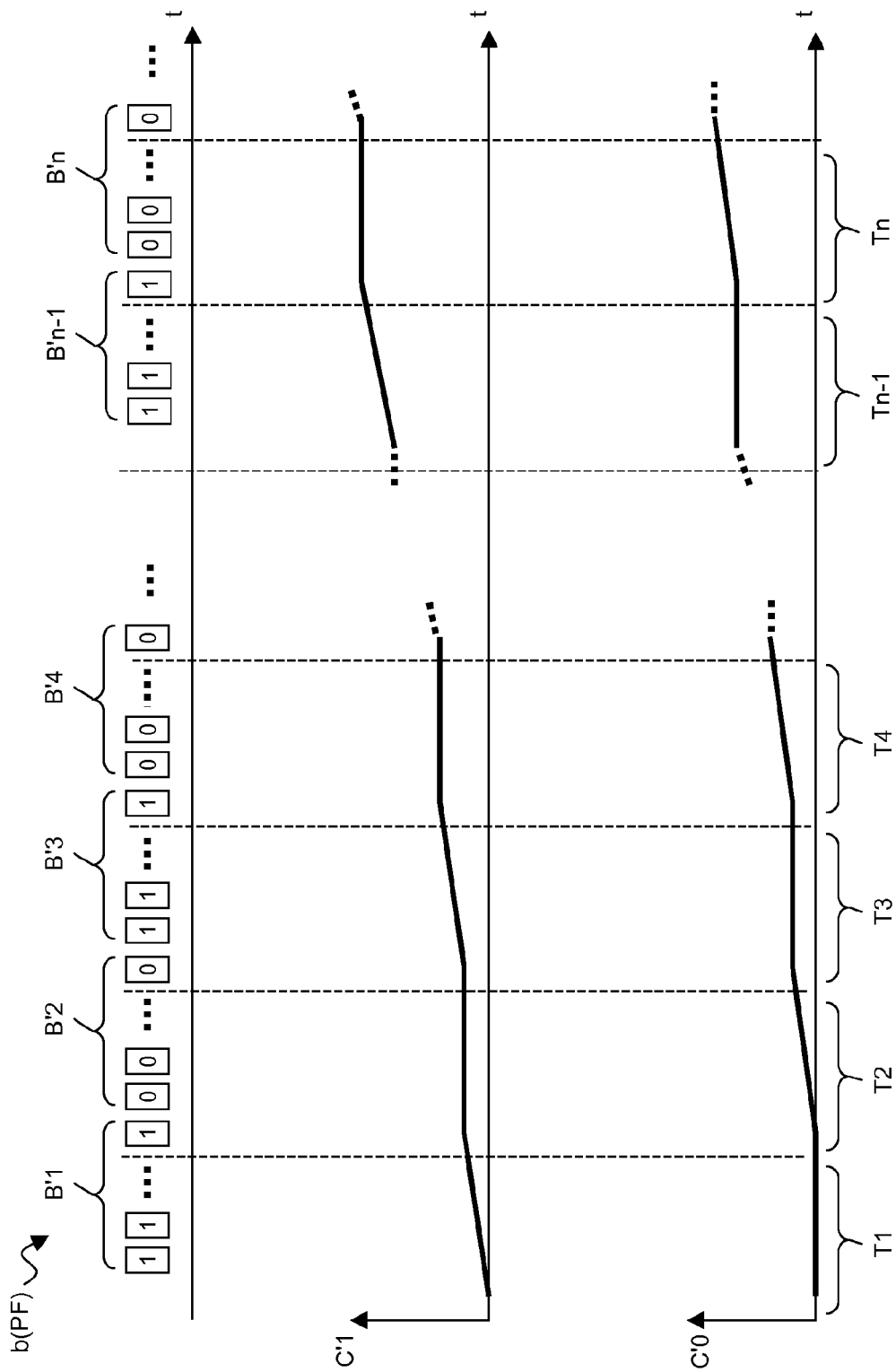
FIG. 7 shows three time diagrams relating to the operation of the second communication device.

By referring now to FIGS. 6a, 6b and 7, the blocks B1, B2, B3, B4, ... Bn−1, Bn are transmitted to the second communication device CD2, that receives corresponding further blocks B'1, B'2, B'3, B'4, ... B'n−1, B'n. Each further block B'1, B'2, B'3, B'4, ... B'n−1, B'n differs from the corresponding block B1, B2, B3, B4, ... Bn−1, Bn in that one or more packets Pki originally comprised in the block have been lost during transmission on the link L1.

When the second communication device CD2 determines that a data loss measurement relative to the packet flow PF has to be started, it preferably initialises a third counter C'1 and a fourth counter C'0 at the value 0 (step 601). Step 601 may be triggered e.g. by a management message transmitted from the management server MS and commanding the second communication device CD2 to start a data loss measurement for the packet flow PF.

Then, the second communication device CD2 listens for possible packets Pki received from the first communication device CD1 on the link L1 (step 602). Each time a packet Pki is received, the second communication device CD2 preferably checks its marking, i.e. it checks the value of its bit bi (step 603).

If the bit bi is equal to 1, the second communication device CD2 preferably increases by one the third counter C'1 (step 604). Otherwise, if the bit bi is equal to 0, the second communication device CD2 preferably increases by one the fourth counter C'0 (step 604').

Therefore, as shown in FIG. 7, while the second communication device CD2 is receiving packets Pki of the odd blocks B'1, B'3, ... B'n−1, the value of the third counter C'1 increases, while the value of the fourth counter CI0 is constant. On the other hand, while the second communication device CD2 is receiving packets Pki of the even blocks B'2, B'4, ... B'n, the value of the fourth counter C'0 increases, while the value of the third counter C'1 is constant.

Substantially in parallel to the above steps of the flow chart of FIG. 6a, the second communication device CD2 also starts a reception timer cyclically counting from 0 to the marking period Tm (step 605).

The detection timer at the second communication device CD2 and the transmission timer at the first communication device CD1 are preferably started substantially at the same time and are preferably synchronized each other, so that they substantially indicate the same current times. To this purpose, the transmission timer and the reception timer are preferably synchronized to the local clocks of the transmitting node N1 and the receiving node N2, respectively, that are in turn reciprocally synchronized. The synchronization of the local clocks in the communication network CN may be achieved by means of any known synchronization protocol, such as for instance the Network Time Protocol (NTP).

When the current time $t^{}$ indicated by the reception timer becomes equal to $k \times Tb$ (k being equal to 0, 1, 2, ... n−1) (step 606), the second communication device CD2 preferably determines the current block period among the block periods T1, T2, T3, T4, ... Tn−1, Tn (step 607). To this purpose, a local copy of the marking timing table MTT is stored also at the receiving node N2 and the second communication device CD2 preferably determines the current block period by comparing the current time t indicated by the reception timer with the content of the marking timing table MTT. In particular, the current block period is determined as the block period whose start time is equal to the read current time t as indicated by the reception timer at step 606**.

Since the transmission timer and the reception timer are synchronized, the current block period determined by the second communication device CD2 at step 607 is substantially the same as the current block period that is simultaneously determined by the first communication device CD1 (see step 404 of FIG. 4).

If the current block period determined at step 607 is an odd block period T1, T3, ... Tn−1, the second communication device CD2 determines that the first communication device CD1 is marking packets by 1, and that accordingly the value of the counter C'1 is currently increasing, whereas the value of the counter C'0 is currently constant. Hence, the second communication device CD2 preferably sends the currently constant value of the fourth counter C0 to the management server MS (step 608).

Otherwise, if the current block period is an even block period T2, T4, ... Tn, the second communication device CD2 determines that the first communication device CD1 is marking packets by 0, and that accordingly the value of the counter C'0 is currently increasing, whereas the value of the counter C'1 is currently constant. Hence, the second communication device CD2 preferably sends the currently constant value of the third counter C'1 to the management server (step 608').

Preferably, at steps 608-608', the time at which the value of the relevant counter C'1 or C'0 is sent to the management server MS is delayed by a safety wait time SWT relative to the start time of the current block period.

Indeed, the time window during which each block B'1, B'2, B'3, B'4, ... B'n−1, B'n is actually received at the second communication device CD2 may be delayed relative to the corresponding block period T1, T2, T3, T4, ... Tn−1, Tn as determined at step 607, as shown in FIG. 7. This delay is mainly due to the propagation delay of packets on the link L1 and on the processing times at the communication devices CD1, CD2. In view of this, the fourth counter C'0 may be increasing in a first part of the odd periods T1, T3, ... Tn−1, while the third counter C'1 may be increasing in a first part of the even periods T2, T4, ... Tn. This delay may be further enhanced by possible tolerances in the synchronization between the transmission timer and the reception timer.

The safety wait time SWT applied at steps 409-409' by the first communication device CD1 and at steps 608-608' by the second communication device CD2 guarantees that the values of the counters C1, C0, C'1 and C'0 are sent to the management server MS only when they are actually constant. The safety wait time SWT is preferably comprised between a minimum value higher than 0 and 50% of the block period Tb. The minimum value is preferably higher than the sum of the maximum expected delay between the first communication device CD1 and the second communication device CD2, the synchronization error between the transmission timer and the reception timer and the processing time required for changing marking at the communication devices CD1, CD2. The minimum value may be equal to e.g. 1% of the block period Tb. For instance, if the block period Tb is equal to 10 minutes, the safety wait time SWT may be equal to e.g. 3 minutes.

Hence, during the odd block periods T1, T3, ... Tn−1, the management server MS receives the values of the counters C0 and C'0 while, during the even block periods T2, T4, ... Tn, it receives the values of the counters C1 and C'1.

At each block period the management server MS may then calculate the data loss as the difference between the received values of the counters (i.e. the difference C1-C'1 during even periods and the difference C0-C'0 during odd periods).

The data loss calculated at each block period actually refers to the block period preceding the current one, since it is calculated based on the values reached by the relevant counters at the end of the preceding block period. For instance, the data loss calculated based on the values of the counters received during the third block period T3 indicates the data loss that affected the packet flow PF at the end of the second block period T2, since it is calculated based on the values reached by the counters C0 and C'0 at the end of the second block period T2.

Once the values of the data loss have been calculated for each block period Tb, they can be processed. For instance, the number of packets Pki lost during a single block period Tb may then be divided by the number of packets Pki transmitted in that block period (which may be derived by the values of the first counter C1 and the second counter C0), thereby providing a packet loss ratio (i.e. the ratio between number of lost packets and number of transmitted packets).

Advantageously, the final values of data loss are independent of the number of packets Pki included in each block. This is due to the fact that they are calculated as a difference between packets transmitted in a block period Tb and packets received in a corresponding block period Tb.

The above described method has a number of advantages.

First of all, it may be easily implemented by the communication devices (ports or interfaces) that are typically available at the nodes of a current communication network.

Moreover, for each block period, only the values of the counters actually needed for calculating the data loss are sent to the management server, while the counters whose values are not currently constant (and that accordingly shall not be used for calculating the data loss) are not sent. Further, the values of the relevant counters are sent to the management server only once within each block period Tb. In other words, the block period Tb is also the measurement period.

For instance, if the block period Tb is 10 minutes, according to the present invention the values of two counters are sent to the management server once every 10 minutes. According to the method of WO 2010/072251, the values of four counters should be detected at least twice every 10 minutes. Assuming that the detection period is e.g. 4 minutes, the values of the four counters should be detected about 2.5 times every 10 minutes. This means that the amount of information to be gathered by the management server MS for implementing the method is advantageously reduced by a factor equal to about 5. Both the computational effort at the nodes and the bandwidth usage on the links of the communication network are accordingly advantageously reduced.

Further, the algorithm implemented by the communication devices CD1, CD2 is advantageously very simple. Indeed, for determining the counters to be sent to the management server that allow a proper data loss calculation, the communication devices simply have to read the current time indicated by their respective timers and check the marking timing table MTT. The Applicant has estimated that the algorithms shown in FIGS. 4, 6a and 6b reduce the computation time of the data loss by about 1/10 in comparison to the algorithm of WO 2010/072251.

On one hand, this allows applying the method for measuring data loss on an increased number of data flows transmitted across the communication network CN, without increasing the block period Tb. Indeed, in a single block period Tb, the nodes may apply the above algorithms for calculating the data loss to a very high number of data flows. On the other hand, given a number of data flows to be measured, this allows reducing the block period Tb for providing a more frequent measurement of the data loss of the data flows. This advantageously allows reducing the delay between a data loss affecting one of the measured data flows and the detection of such data loss.

Further, advantageously, thanks to their synchronized timers and to the marking timing table MTT, the communication devices CD1 and CD2 are always aware of the current marking applied to packets, and are accordingly capable of determining which counters shall be used for properly calculating the data loss, even at block periods during which there are no packets to be transmitted.

According to a second embodiment of the present invention, the above described method may be used for performing, in addition to a data loss measurement, also a time measurement on the data flow PF.

Figure 8:
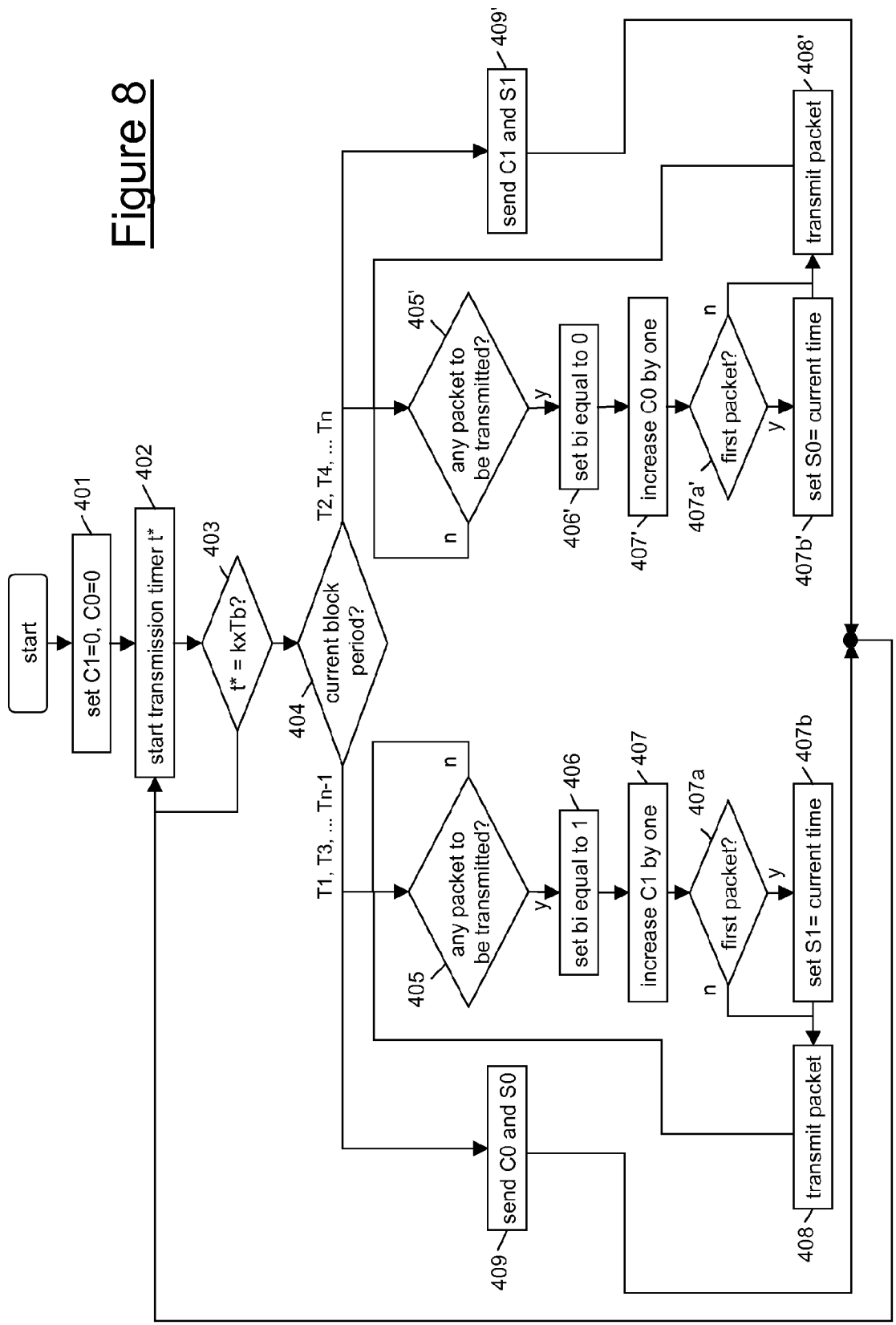
FIG. 8 is a flow chart of the operation of the first communication device, according to a second embodiment of the present invention.

With reference to FIG. 8, that shows the operation of the first communication device CD1 according to the second embodiment of the present invention, if at step 404 the first communication device CD1 determines that the current block period is an odd period T1, T3 . . . , Tn−1, after marking by 1 each packet Pki to be transmitted (step 406) and increasing the counter C1 by one (step 407), the first communication device CD1 preferably determines whether the packet Pki is the first one to be transmitted during the current odd block period (step 407a). In the affirmative, the first communication device CD1 preferably sets a first transmission timestamp S1 equal to the current time indicated by the transmission timer (step 407b).

Otherwise, if at step 404 the first communication device CD1 determines that the current block period is an even period T2, T4 . . . , Tn, after marking by 0 each packet Pki to be transmitted (step 406') and increasing the counter C0 by one (step 407'), the first communication device CD1 preferably determines whether the packet Pki is the first one to be transmitted during the current even block period (step 407a'). In the affirmative, the first communication device CD1 preferably sets a second transmission timestamp S0 equal to the current time indicated by the transmission timer (step 407b').

Besides, if the current block period determined at step 404 is an odd period T1, T3, . . . Tn−1, at step 409 the first communication device CD1 sends to the management server MS the currently constant value of the second counter C0 and, in addition, the current value of the second transmission timestamp S0 (step 409). Otherwise, if the current block period determined at step 404 is an even period T2, T4, . . . Tn, at step 409' the first communication device CD1 sends to the management server MS the currently constant value of the first counter C1 and, in addition, the current value of the first transmission timestamp S1 (step 409').

Figure 9B:
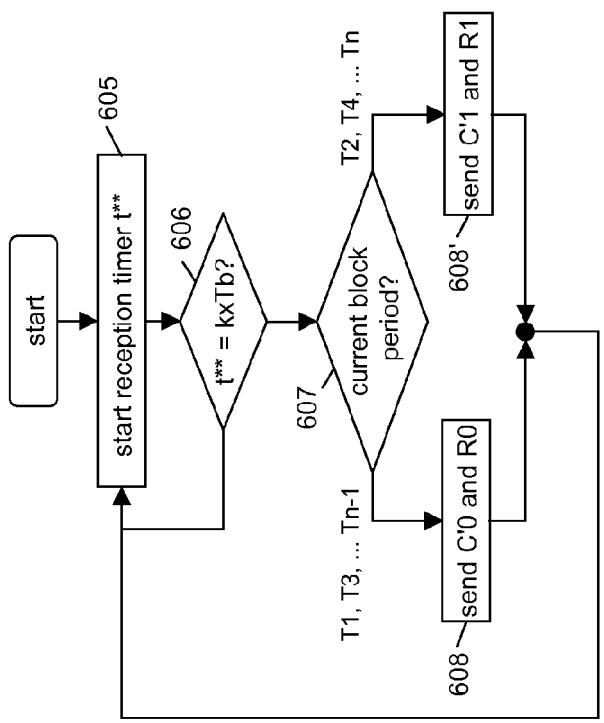
FIGS. 9a and 9b are flow charts of the operation of the second communication device, according to the second embodiment of the present invention.
Figure 9A:
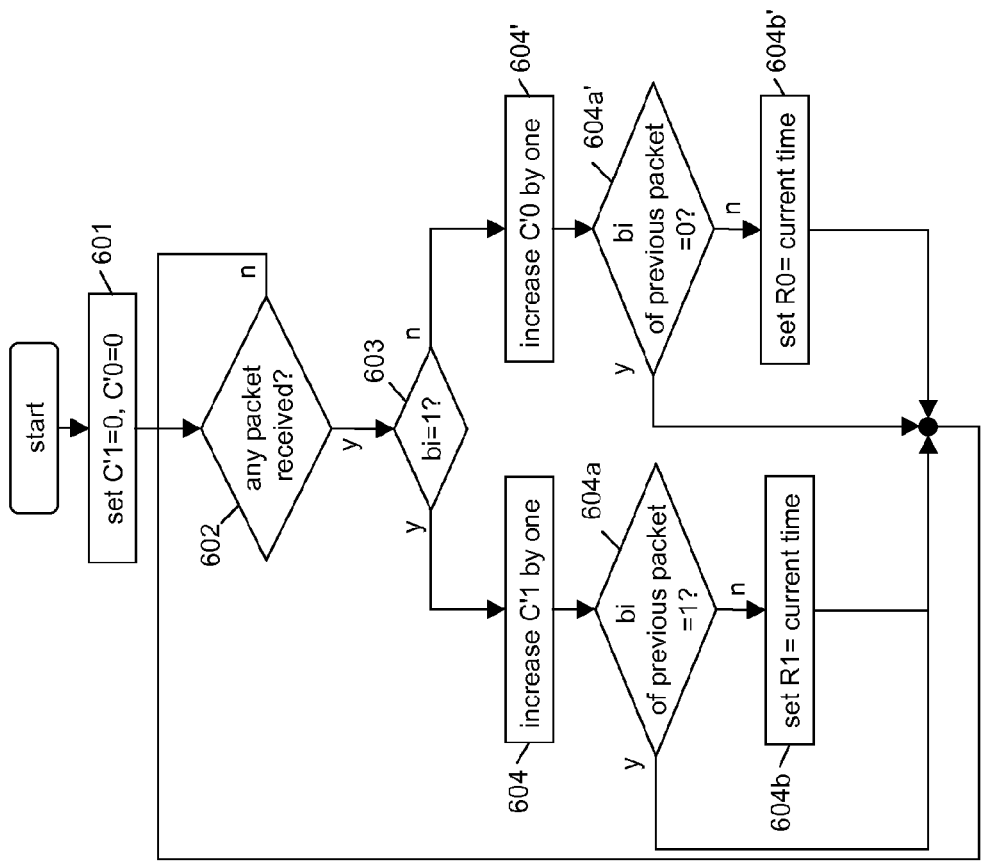

With reference to FIGS. 9a and 9b, that show the operation of the second communication device CD2 according to the second embodiment of the present invention, if at step 603 the second communication device CD2 determines that the currently received packet is marked by 1, after increasing the counter C'1 by one (step 604), the second communication device CD2 preferably checks whether the previously received packet has the same marking as the current packet Pki (step 604a). In the affirmative, the second communication device CD2 determines that the packet Pki is not the first packet of a block, and preferably does not perform any other action. In the negative, the second communication device CD2 determines that the packet Pki is the first packet of a block, and preferably sets a first reception timestamp R1 equal to the current time indicated by the reception timer (step 604b).

Otherwise, if at step 603 the second communication device CD2 determines that the currently received packet is marked by 0, after increasing the counter C'0 by one (step 604'), the second communication device CD2 preferably checks whether the previously received packet has the same marking as the current packet Pki (step 604a'). In the affirmative, the second communication device CD2 determines that the packet Pki is not the first packet of a block, and preferably does not perform any other action. In the negative, the second communication device CD2 determines that the packet Pki is the first packet of a block, and preferably sets a second reception timestamp R2 equal to the current time indicated by the reception timer (step 604b').

Similarly to the first embodiment, in parallel to the above described steps the second communication device CD2 also starts a reception timer cyclically counting from 0 to the marking period Tm (step 605) and, based on it, determines the current block period (steps 606 and 607).

If the current block period determined at step 607 is an odd block period T1, T3, . . . Tn−1, the second communication device CD2 determines that the value of the counter C'0 is currently constant and accordingly sends the currently constant value of the fourth counter C'0 and the current value of the second reception timestamp R0 to the management server MS (step 608).

Otherwise, if the current block period is an even block period T2, T4, . . . Tn, the second communication device CD2 determines that the value of the counter C'1 is currently constant and accordingly sends the currently constant value of the third counter C'1 and the current value of the first reception timestamp R1 to the management server (step 608').

Hence, according to the second embodiment, during the odd block periods T1, T3, . . . Tn−1, the management server MS receives the values of the counters C0 and C'0 and of the timestamps S0 and R0 while, during the even block periods T2, T4, . . . Tn, it receives the values of the counters C1 and C'1 and of the timestamps S1 and R1.

At each block period the management server MS may then calculate the data loss as the difference between the received values of the counters (i.e. the difference C1-C'1 during even periods and the difference C0-C'0 during odd periods).

In addition, at each block period the management server MS may calculate the delay as the difference between the received values of the timestamps (i.e. the difference R1-S1 during even periods and the difference R0-S0 during odd periods). The delay calculated at a given block period substantially is the delay induced by propagation from the first communication device CD1 to the second communication device CD2 on the first packet transmitted during the block period preceding the current one. For instance, if the block period Tb equals 10 minutes and the marking period Tm equals 60 minutes, when the transmission timer and the reception timer (that are reciprocally synchronized) indicate a current time t*=t** equal to 30 minutes, at steps 404 and 607 the determined current block period is T4, whose associated marking is 0. Hence, communication devices CD1 and CD2 send to the management server MS the values of the timestamps S1 and R1, respectively, that indicate the transmission time and the reception time of the first packet transmitted during the preceding block period, i.e. T3.

In addition to calculating the delay, the management server MS may calculate also an interarrival jitter as a difference between the delay calculated at the current block period and the delay calculated at the preceding block period.

Preferably, at each block period the management server MS calculates the delay and/or the interarrival jitter only if the data loss calculated within the same block period is equal to 0. Indeed, if the packet transmitted first during a block period is lost before reaching the second communication device CD2, the value assigned to the reception timestamp R0 or R1 during that block period relates to a subsequent packet of that block, and not to the first one. Hence, a time measurement performed based on such reception timestamp is intrinsically inaccurate, because it is calculated as a difference between timestamps that relate to different packets.

However, if the first packet of a block period is lost during transmission from first communication device CD1 to the second communication device CD2, this does not impair the accuracy of delay and interarrival jitter measurements referred to the following blocks. Indeed, loss of the first packet (or of any other packet) in a block does not prevent the second communication device CD2 from recognizing the first packet of the successive block, and from properly setting the receiving timestamp for that block. From then on, the delay and interarrival jitter measurement will be then immune from inaccuracy due to loss of the first packet in the previous block.

The time measurements are not necessarily based on the first packets of each block. According to variants of the present invention, the transmission timestamps and the reception timestamps may be set for a different packet of the block. Further, for increasing the measurement period of delay and interarrival jitter without reducing the block period Tb, the transmission timestamp and the reception timestamp may be set for more than one packet for each block (e.g. the first, the 100th, the 200th, etc.). At each block period, the communication devices CD1 and CD2 send to the management server MS all the values of the transmission timestamp and the reception timestamp.

The method according to the second embodiment of the present invention basically has the same advantages as the method according to the first embodiment, namely: reduced computational effort at the management server MS, low bandwidth usage on the links of the communication network, possibility to provide a measurement even when traffic between CD1 and CD2 is missing for one or more block periods.

As described above, both the first communication device CD1 and the second communication device CD2 are capable of determining the current block period based on the current times indicated by the transmission timer and the reception timer, respectively. In particular, the current time is compared with the content of the marking timing table MTT.

According to advantageous variants of the present invention, both the first communication device CD1 and the second communication device CD2 are capable of determining the current block period (and hence the counters and possibly the timestamps to be sent to the management server MS) by simply processing the current times t* and t** indicated by the transmission timer and the reception timer, respectively, without using the marking timing table MTT.

According to these other embodiments, communication devices CD1 and CD2 know the duration Tb of the block periods and know the marking associated to the first block period T1 of each marking period Tm. Herein after, it is assumed that this marking is 1.

Assuming that the block period Tb is equal to an odd number of minutes (e.g. 5 minutes), the start time of the odd block periods T1, T3, ... Tn−1 expressed in minutes is 0 or an even number (10, 20, etc.), whereas the start time of the even block periods T2, T4, ... Tn expressed in minutes is an odd number (5, 15, etc.).

Hence, at steps 404, the first communication device CD1 checks whether the current time t* indicated by the transmission timer (that, as described above, is equal to k*Tb, k being equal to 0, 1, 2, ... n−1) is an odd or an even number (expressed in minutes). If the current time t* expressed in minutes is an even number, the first communication device CD1 determines that an odd block period T1, T3, ... Tn−1 is starting, and then sends to the management server MS the current value of the counter C0 and, possibly, the current value of the transmission timestamp S0 (step 409). Otherwise, if the current time t* expressed in minutes is an odd number, the first communication device CD1 determines that an even block period T2, T4, ... Tn is starting, and then sends to the management server MS the current value of the counter C1 and, possibly, the current value of the transmission timestamp S1 (step 409').

Similarly, at steps 607, the second communication device CD2 checks whether the current time t** indicated by the reception timer (that, as described above, is equal to k*Tb, k being equal to 0, 1, 2, ... n−1) is an odd or an even number (expressed in minutes). If the current time t expressed in minutes is an even number, the second communication device CD2 determines that an odd block period T1, T3, ... Tn−1 is starting, and then sends to the management server MS the current value of the counter C'0 and, possibly, the current value of the reception timestamp R0 (step 608). Otherwise, if the current time t expressed in minutes is an odd number, the second communication device CD2 determines that an even block period T2, T4, ... Tn is starting, and then sends to the management server MS the current value of the counter C'1 and, possibly, the current value of the reception timestamp R1 (step 608').

Assuming now that the block period Tb is equal to an even number of minutes (e.g. 10 minutes), the start time of the odd block periods T1, T3, ... Tn−1 expressed in minutes is 0 or an integer multiple of 2Tb (20, 40, etc.), whereas the start time of the even block periods T2, T4, ... Tn expressed in minutes is not an integer multiple of 2Tb (10, 30, etc.)

Hence, at step 404 the first communication device CD1 checks whether the current time t* indicated by the transmission timer (that, as described above, is equal to k*Tb, k being equal to 0, 1, 2, ... n−1) is an integer multiple of 2Tb (expressed in minutes). In the affirmative, the first communication device CD1 determines that an odd block period T1, T3, ... Tn−1 is starting, and then sends to the management server MS the current value of the counter C0 and, possibly, the current value of the transmission timestamp S0 (step 409). In the negative, the first communication device CD1 determines that an even block period T2, T4, ... Tn is starting, and then sends to the management server MS the current value of the counter C1 and, possibly, the current value of the transmission timestamp S1 (step 409').

Similarly, at step 607 the second communication device CD2 checks whether the current time t** indicated by the reception timer (that, as described above, is equal to k*Tb, k being equal to 0, 1, 2, ... n−1) is an integer multiple of 2Tb (expressed in minutes). In the affirmative, the second communication device CD2 determines that an odd block period T1, T3, ... Tn−1 is starting, and then sends to the management server MS the current value of the counter C'0 and, possibly, the current value of the reception timestamp R0 (step 608). In the negative, the second communication device CD2 determines that an even block period T2, T4, ... Tn is starting, and then sends to the management server MS the current value of the counter C'1 and, possibly, the current value of the reception timestamp R1 (step 608').

Therefore, according to such embodiments, the first and second communication devices CD1 and CD2 are capable of determining the current block period (and hence the counters and, possibly, the timestamps to be sent to the management server MS) without the need of cooperating with the marking timing table MTT.

Although the method has been described in detail only for measuring data loss (and possibly for making also time measurements) of a packet flow PF between two physically adjacent nodes (i.e. the transmitting node N1 and the receiving node N2), according to embodiments not shown in the drawings, it can be used for measuring a packet flow between two non-physically adjacent nodes. In particular, it can be used for measuring the data loss relative to an end-to-end packet flow transmitted from a given source node to a given destination node. In this case, the source node preferably identifies the packets belonging to the end-to-end packet flow (e.g. by using their source address and their destination address) and marks only the identified packets. On the other hand, also the destination node identifies the packets belonging to the end-to-end packet flow, and reads the marking of the identified packets only.

The above method may be applied both in case of point-to-point transmission, and in case of point-to-multipoint, or multicast, transmission. In this latter case, a separate measurement of data loss can be performed for each destination node of the point-to-multipoint transmission.

According to further embodiments, the above disclosed method is applied to an end-to-end packet flow for measuring the end-to-end data loss and also the amount of data lost on each intermediate hop. To this purpose, each intermediate node preferably comprises a communication device configured to apply the algorithm of FIGS. 6a-6b or 9a-9b to packets received from an upstream node, and a further communication device configured to apply the algorithm of FIG. 4 or 8 to the same packets before forwarding them to a downstream node. In this way, each intermediate node provides the management server MS with a first couple of counters (and, possibly, with a first couple of timestamps) relative to incoming packets marked by 1 or 0, and a second couple of counters (and, possibly, with a second couple of timestamps) relative to outgoing packets marked by 1 or 0. The management server MS preferably processes the counters and timestamps received by the various nodes at each block period for deriving end-to-end measurements, link measurements (i.e. measurements relative to transmission between two physically adjacent nodes) and inter-node measurement (i.e. measurements relative to the transition of packets across each node).

According to further embodiments not shown in the drawings, in addition to the bit bi, at least another bit of each packet Pki is reserved for marking the packets Pki. For instance, a further bit in the header of each packet Pki may be used for marking the packet Pki as follows: when this further bit is set to 0, it indicates that this packet Pki belongs to a packet flow currently not under measurement, while when this further bit is equal to 1, it indicates that the packet Pki belongs to a packet flow currently under measurement. This advantageously allows packets of a packet flow to be measured to be distinguished from other packet flows not to be measured without the need to read any other information in the packet header (such as for instance the source node address or the destination node address, as mentioned above). According to still further embodiments not shown in the drawings, a number of bits of the header of each packet Pki may be used for marking the packets so as to indicate different packet flows to be measured. For instance, 2 bits of the header would allow identifying three different packets flows, while 3 bits would allow identifying seven different packet flows.

The bit bi (and possible further bits for identifying the packets flows to be measured) may be provided into the header of packets to be transmitted by suitably modifying the protocols according to which the packets are formatted. For instance, if the packets Pki are formatted according to the MPLS (Multi Protocol Label Switching), the label field of the MPLS header may include the bit bi and may also be used for identifying different packet flows to be measured. In this situation, the label field of the packet headers is used for alternately transmitting the packets Pki from the first communication device CD1 to the second communication device CD2 through a first tunnel T1 (for a block period Tb) and a second tunnel T2 (for a block period Tb). Therefore, a first packet flow PF1 is transmitted through the first tunnel T1, and a second packet flow PF2 is transmitted through the second tunnel T2. For measuring data loss on the link between CD1 and CD2, data loss is separately measured on the first tunnel T1 and on the second tunnel T2. In particular, the number of packets entering and exiting each tunnel is measured, substantially with a same measurement period equal to the block period Tb, according to the procedure described above. If a number of packet flows has to be transmitted from the first communication device CD1 to the second communication device CD2, each packet flow is assigned to a respective pair of tunnels. For each packet flow, the measurement of data loss is performed as described above.

According to alternative embodiments not shown in the drawings, the first communication device CD1 only marks the packets upon their transmission and properly increases the counters C1 and C0, and the second communication device CD2 only reads the marking of the received packets and properly increases the counters C'1 and C'0, while the management server MS is responsible of deciding which counters shall be gathered from the communication devices CD1 and CD2 at each block period. To this purpose, the management server MS is preferably provided with a timer synchronized at least to the transmission timer of the first communication device CD1. This allows the management server MS determining the current block period and the marking that is currently applied by the first communication device CD1. Based on this determination, the management server MS may request to the communication devices CD1 and CD2 the values of the counters that are currently not increasing.

The invention claimed is:

1. A method for performing a measurement on a data flow, said method comprising:
   a) upon transmission of said data flow of a plurality of data units from a first communication device to a second communication device of a communication network: during first block periods that alternate in time with second block periods, marking each data unit of said data flow by setting a feature of said each data unit to a first value, and updating a first parameter relating to said data units;
   b) upon reception of said data flow at said second communication device: checking said feature for each received data unit and updating a second parameter relating to said data units when said feature is equal to said first value;
   c) while steps a) and b) are performed, processing a timer for determining whether a current block period is one of said second block periods and, if so, providing a current value of said first parameter and a current value of said second parameter; and d) performing, by a management server in communication with said first communication device and said second communication device, a measurement on said data flow using said current value of said first parameter and said current value of said second parameter.

2. The method according to claim 1, wherein:
at said step a), said updating comprises increasing a first transmission counter upon transmission of each data unit having said feature set to said first value;
at said step b), said updating comprises increasing a first reception counter upon reception of each data unit having said feature set to said first value;
at said step c), said providing comprises providing a current value of said first transmission counter and a current value of said first reception counter; and
at said step d), said performing a measurement comprises calculating a data loss as a difference between said current value of said first transmission counter and said current value of said first reception counter.

3. The method according to claim 1, wherein:
at said step a), said updating comprises updating a first transmission timestamp upon transmission of a predetermined data unit having said feature set to said first value;
at said step b), said updating comprises setting a first reception timestamp upon reception of said predetermined data unit;
at said step c), said providing comprises providing a current value of said first transmission timestamp and a current value of said first reception timestamp; and
at said step d), said performing a measurement comprises performing a time measurement using said current value of said first transmission timestamp and said current value of said first reception timestamp.

4. The method according to claim 3, wherein performing a time measurement comprises measuring at least one of a delay and an interarrival jitter of said data flow.

5. The method according to claim 1, wherein all said first block periods and said second block periods have a same duration.

6. The method according to claim 5, wherein in said step c) said timer counts a marking period equal to an even integer multiple of said duration.

7. The method according to claim 6, wherein said step c) comprises comparing a current time indicated by said timer, with a marking timing table comprising information on start time and/or end time of at least one of said first block periods and said second block periods.

8. The method according to claim 5, wherein said duration is equal to an odd number of time measurement units and wherein step c) comprises determining whether a current time indicated by said timer and expressed in said time measurement units is a multiple of said duration and is an even number.

9. The method according to claim 5, wherein said duration is equal to an even number of time measurement units and wherein step c) comprises determining whether a current time indicated by said timer and expressed in said time measurement units is not an integer multiple of said duration multiplied by 2.

10. The method according to claim 1, wherein:
said step a) further comprises, during said second block periods, marking each data unit of said data flow by setting said feature of said data unit to a second value, and updating a third parameter relating to said data units;
said step b) further comprises updating a fourth parameter relating to said data units when said feature is equal to said second value;
said step c) comprises, if the current block period is determined not to be one of said second block periods, providing a current value of said third parameter and a current value of said fourth parameter; and
said step d) comprises performing said measurement using said current value of said third parameter and said current value of said fourth parameter.

11. The method according to claim 1, wherein said step c) is performed by said first communication device.

12. The method according to claim 11, wherein said step c) is performed also by said second communication device.

13. The method according to claim 12, wherein said step d) is performed by a management server (MS) cooperating with said communication network.

14. The method according to claim 13, wherein said step c) comprises:
at said first communication device, processing a transmission timer for determining whether a current block period is one of said second block periods and, if so, sending said current value of said first parameter to said management server; and
at said second communication device, processing a reception timer synchronized to said timer for determining whether a current block period is one of said second block periods and, if so, sending said current value of said second parameter to said management server.

15. A communication network comprising:
a first communication device; and
a second communication device,
wherein:
said first communication device is configured to transmit a data flow including a plurality of data units to said second communication device and, upon transmission of said data flow, during first block periods that alternate in time with second block periods, mark each data unit of said data flow by setting a feature of said each data unit to a first value, and update a first parameter relating to said data units;
said second communication device is configured to receive said data flow from said first communication device and, upon reception of said data flow, check said feature for each received data unit and update a second parameter relating to said data units when said feature is equal to said first value; and said first communication device and said second communication device are further configured to process a timer for determining whether a current block period is one of said second block periods and, if so, to provide a current value of said first parameter and a current value of said second parameter to a management server for performing a measurement on said data flow.

* * * * *